United States Patent [19]
Bosher et al.

[11] Patent Number: 5,791,150
[45] Date of Patent: Aug. 11, 1998

[54] PALLET BASED REFRIGERATED TRANSPORTATION SYSTEM

[75] Inventors: Paul Raymond Bosher; Philip Barry Grainger, both of Auckland, New Zealand

[73] Assignee: Transphere Systems Limited, Auckland, New Zealand

[21] Appl. No.: 693,330

[22] PCT Filed: Feb. 20, 1995

[86] PCT No.: PCT/NZ95/00018

§ 371 Date: Oct. 8, 1996

§ 102(e) Date: Oct. 8, 1996

[87] PCT Pub. No.: WO95/22728

PCT Pub. Date: Aug. 24, 1995

[30] Foreign Application Priority Data

Feb. 18, 1994 [NZ] New Zealand ............ 250914
Feb. 21, 1994 [NZ] New Zealand ............ 250929

[51] Int. Cl.[6] .................................... F25D 25/00
[52] U.S. Cl. ................... 62/62; 62/237; 62/236; 62/384
[58] Field of Search .................... 62/237, 236, 239, 62/384, 62

[56] References Cited

U.S. PATENT DOCUMENTS 3,621,672 11/1971 Meredith ................... 62/237
4,852,365 8/1989 Elrod et al. ............... 62/237

Primary Examiner—Harold Joyce
Assistant Examiner—Pamela A. O'Connor
Attorney, Agent, or Firm—Young & Thompson

[57] ABSTRACT

To transport and/or store produce, individual refrigeration units are provided for palletised packages. A load of produce (201) is enclosed by packaging which acts as a gas barrier, e.g., a plastics bag (2), corrugated cardboard, etc. The packaging may optionally also include insulation (200). In one option the refrigeration unit is in or on the pallet (3). The gas flow across the evaporator (15 (i.e., the flow internal to the gas barrier) is kept separate from the gas flow across the condenser (10) (which flow results in heating of the ambient air) by such measures as physical separation of condenser and evaporator and ducting or channels in the pallet. In another option the refrigeration unit sits on the produce. In this case separation of the gas flows may be achieved by sealing of the barrier (e.g., clamping of the mouth of a plastic bag by an O-ring) to a flange encircling the condenser.

10 Claims, 11 Drawing Sheets

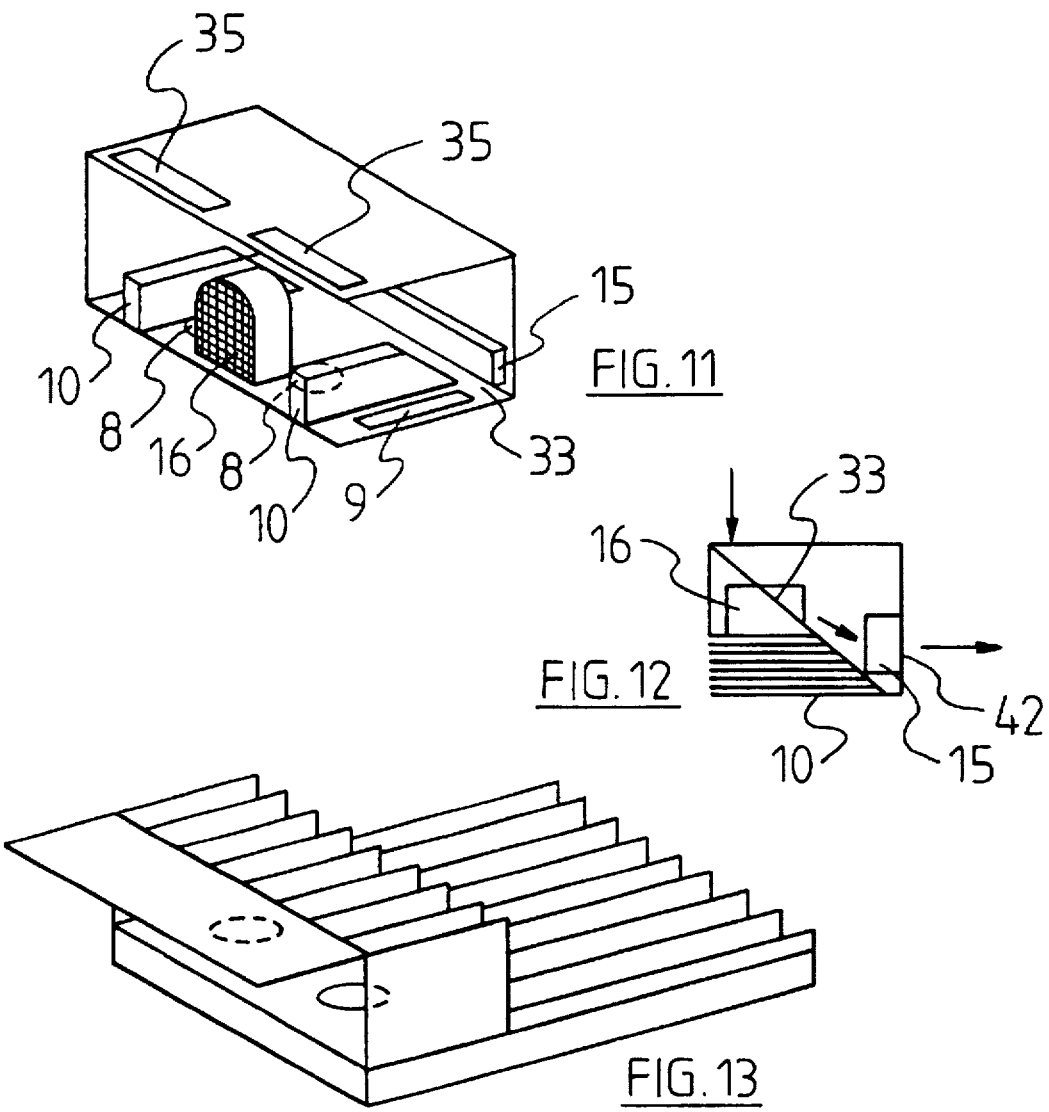
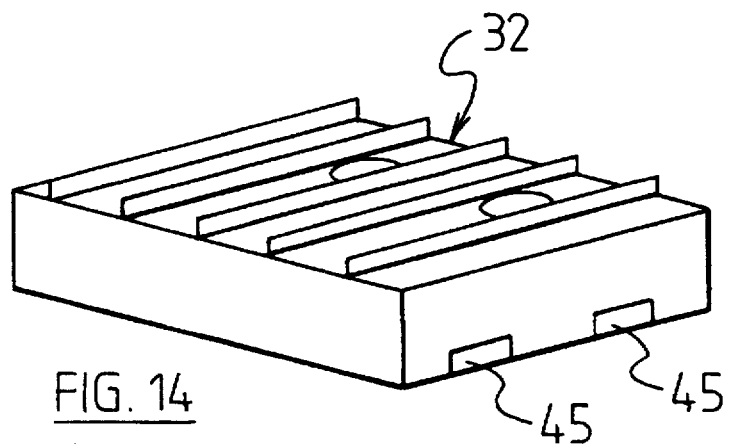

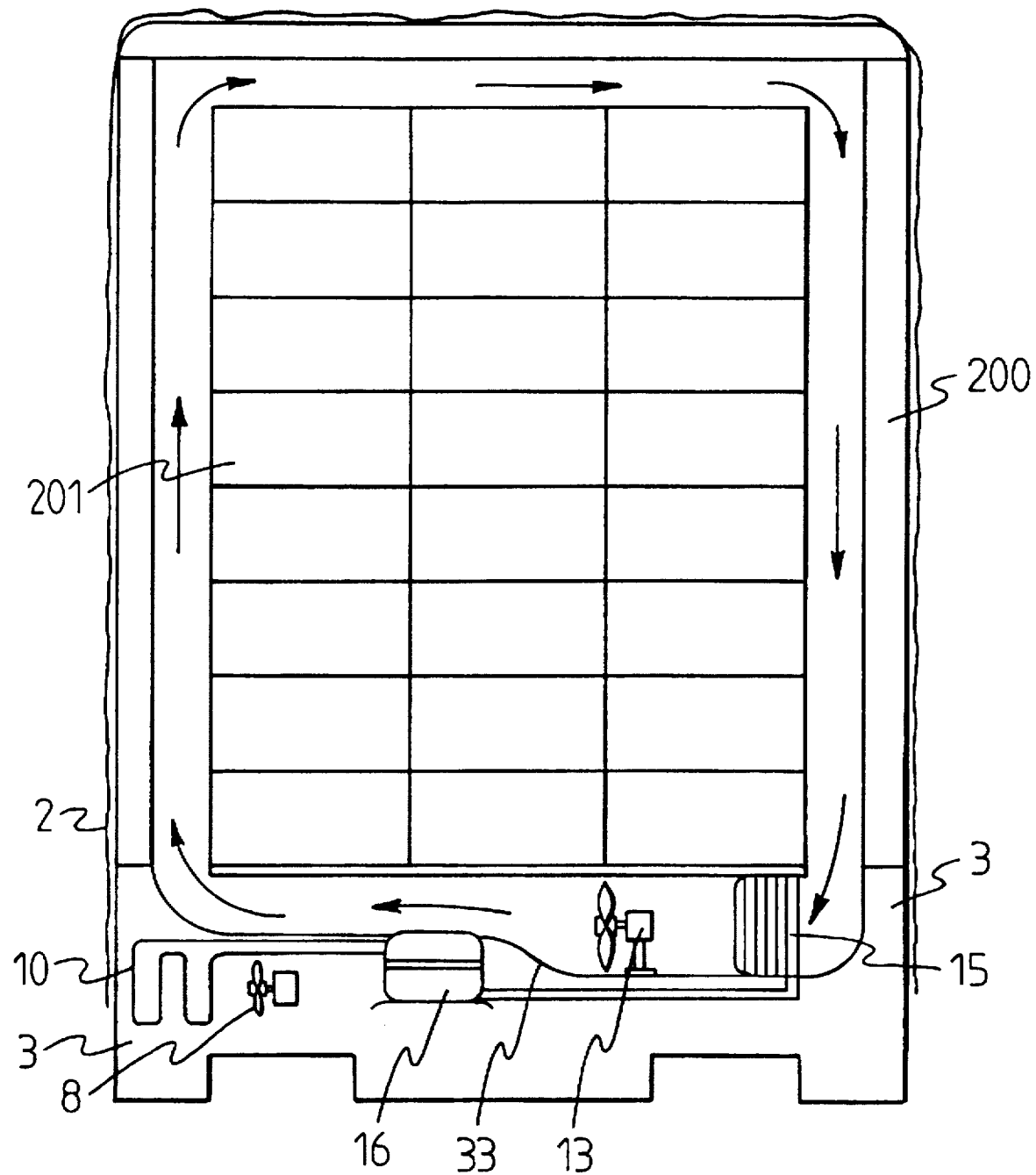

PALLET BASED REFRIGERATED TRANSPORTATION SYSTEM

TECHNICAL FIELD

The present invention relates to improvements in and/or relating to pallet based refrigerated transportation systems or storage/transport containers which enable mixed loads to be transported/stored within a common environment.

BACKGROUND ART

Many containerised systems have been proposed whereby refrigerated meats or respiring comestibles can be transported while under refrigeration and a controlled atmosphere.

The size and expense of such containers has meant that their size has been such that a great deal of produce needs to be assembled and even once packed in the containers there is a need to await specialised shipping.

There are applications for refrigerated cargoes based on a pallet system that do not require specialized shipping (as with containers) and, since a pallet system normally handles volumes less than that of a true shipping container, there is a very much reduced need to aggregate produce in sufficient quantities to enable the filling of the transporting apparatus.

This realization in relation to meats which, when in containers destined for the northern hemisphere, normally required atmospheric control (normally high carbon dioxide concentrations) in addition to refrigeration has meant that in many instances chilled meats can be packed on a pallet and reach the market place in the northern hemisphere within the shelf life of simple refrigeration without a controlled atmosphere. A hybrid version would be one including a simple gas flushing followed by a possible gas injection at the time of packing but without any ongoing control. A more sophisticated form would include some gas environment monitoring and adjustment (eg flushing/scrubbing).

DISCLOSURE OF INVENTION

The present invention however is directed to apparatus and means whereby, if desired, a pallet based transportation system for chilled meats or other produce (eg vegetables) can be provided irrespective of whether or not there is any initial gas flushing or continuing monitoring of the gas environment with corrective measures.

In a first aspect the present invention consists in a method of transporting and/or storing produce or other cargo comprising the steps of:

providing a pallet member (whether of wood, metal or other materials);

loading (directly or indirectly) onto the pallet member the produce or cargo to be carried;

at least partially encompassing the produce or cargo (before and/or after said loading) with a barrier material (e.g. cardboard, paper or a plastics film material);

providing a refrigeration system associated directly or indirectly with or within said pallet member, said refrigeration system having a gas inlet and a gas outlet (common or separate) to and from the evaporator region of the refrigeration system a gas intake gas air outlet (common or separate) to and from the condenser region of the refrigeration system, there being a gas barrier between the two intake/outlet systems to prevent the movement of gas from one to the other; and operating said refrigeration system carried directly or indirectly by said pallet member to cool the produce or cargo, said barrier material providing some measure of separation between the gas associated with the produce being cooled by the evaporator of the refrigeration system and the ambient gaseous environment being heated by the compressor of the refrigeration system.

Preferably said barrier material is of corrugated cardboard and/or a plastics film.

In another aspect the present invention consists in a method of transporting and/or storing produce or cargo comprising the steps of:

providing a fork lift carryable pallet, said pallet having thereon or therein a refrigeration system, said refrigeration system having gas inlet and a gas outlet (common or separate) to and from the evaporator region of the refrigeration system a gas intake and gas outlet (common or separate) to and from the condenser region of the refrigeration system, there being a gas barrier between the two intake/outlet systems to prevent the movement of gas from one to the other;

loading (directly or indirectly) on said pallet, the produce or cargo to be carried;

encompassing the produce (before and/or after said loading) with a barrier material (eg. cardboard, paper or a plastics film material or similar);

operating the refrigeration system to cool said produce or cargo and/or gas associated with said produce, said barrier material providing some measure of separation between the gas associated with the produce or cargo being cooled by the evaporator of the refrigeration system and the ambient gaseous environment being heated by the compressor of the refrigeration system.

In yet another aspect the present invention consists in a fork lift carryable pallet comprising a housing having a refrigeration system therein, a gas intake, a gas outlet (common or separate) to and from the evaporator region of the refrigeration system a gas intake and gas outlet (common or separate) to and from the condenser region of the refrigeration system, there being a gas barrier between the two intake/outlet systems to substantially prevent the movement of gas from one to the other.

Preferably said gas inlet/outlet to and from said evaporator region of the refrigeration system is along one side of said pallet and said gas inlet/outlet to and from said condenser region of said refrigeration system is along a substantially opposite side.

Preferably said fork lift has at least two channels and said gas inlet/outlet to and from said evaporator region is through or along one said channel and gas inlet/outlet to and from the condenser region is through or along the other said channel.

In yet another aspect the present invention consists in a transportable unit comprising:

a fork lift carryable pallet;

cargo or produce loaded directly or indirectly on to said fork lift carryable pallet;

a barrier material enclosing said cargo or produce and providing at least some measure of separation between the gas associated with the produce or cargo being cooled by the evaporator of the refrigeration system and the ambient gaseous environment being heated by the compressor of the refrigeration system.

In yet another aspect the invention consists in a refrigeration unit for association with a pallet based pack, said unit comprising a housing having an electrically operated refrigeration system therein, a gas intake and gas outlet (common or separate) to and from the evaporator region of the refrigeration system and an gas intake and gas outlet (common or separate) to and from the condenser region of the refrigeration system there being a gas barrier between the two intake/outlet systems to prevent the movement of gas from one to the other, the apparatus being characterized in that means is provided whereby the mouth of a plastics, paper and/or foil (hereafter "plastics") bag can be sealed to the housing about said gas inlet/outlet to the condenser region and further characterized in that there is provision for an external energization and/or internal energization of the refrigeration system.

Preferably said gas intake and gas outlet to the evaporator region is within a boss or flanged region of the housing about which the mouth of a plastics bag can be held by, for example, O-rings, tape, clamps or other means.

Preferably said housing includes an encircling channel or other means into which a region of the plastics bag (ie. the mouth) can be wedged or otherwise held.

Preferably said refrigeration unit is combined into a forklift carryable pallet and preferably combined such that the pallet and the refrigeration unit share a common top surface.

Preferably said refrigeration unit can be positioned on the pallet or can be mounted above the pallet but not in contact therewith, being supported above the pallet and/or at least some of the produce by said barrier material or members associated therewith.

In yet another aspect the present invention consists in a method of transporting and/or storing produce or other cargo (herein "produce") to be refrigerated which comprises providing a pallet member (whether of wood, metal or other material), placing (indirectly or directly) thereon a plastics bag ("plastics" as previously defined), loading in/on said bag the produce or cargo to be transported, providing with some structural element(s) (whether of wood, cardboard or other materials) a support above the pallet (and preferably above or substantially above the highest extremity of the produce), locating on the support (directly or indirectly) a refrigeration unit thereafter sealing the mouth of the plastics bag to the refrigeration unit about the gas intake and gas outlet to and from the condenser region thereof and before, simultaneously and/or thereafter, at least from time to time, operating the refrigeration unit.

Preferably said system does not include a gas flushing step nor an air evacuation step.

In yet another aspect the present invention consists in a method, apparatus or a system substantially as hereinafter described with reference to any one, some or more of the accompanying drawings:

BRIEF DESCRIPTION OF INVENTION

FIG. 1 is one packed form of apparatus of the system having a cardboard surround of packaged or loose produce (preferably meat), there being members placed across the top of that surround which supports the refrigeration unit, the plastics bag (preferably transparent) being taken up from underneath the produce over the outside of the surround and over the unit to which it is sealed around (preferably) a boss or flange which surrounds the air intake and in the air outlet to and from the condenser region of the refrigeration system;

FIG. 1a shows a side view of FIG. 1;

FIG. 2 shows an alternative arrangement to that described in relation to FIG. 1 whereby the plastics bag placed on the pallet [preferably with its base liner of cardboard or plastics material] has produce packed thereon in cartons, thus providing a good measure of its own vertical stability, the plastic bag being sealed to the refrigeration unit that derives its vertical support from the cartons themselves, there preferably additionally being a wrapping around of, for example, double fluted cardboard or other materials to provide a measure of thermal insulation the degree of insulation being selected to suit the requirements of the product;

FIG. 11 is a perspective view of the refrigeration unit itself;

FIG. 12 is a side view of the refrigeration unit of FIG. 11;

FIG. 13 is a perspective view of an alternative form of the invention with a swinging side door of the refrigeration unit;

FIG. 14 is a perspective view of the integral pallet based refrigeration unit of FIG. 8;

Figure 8:
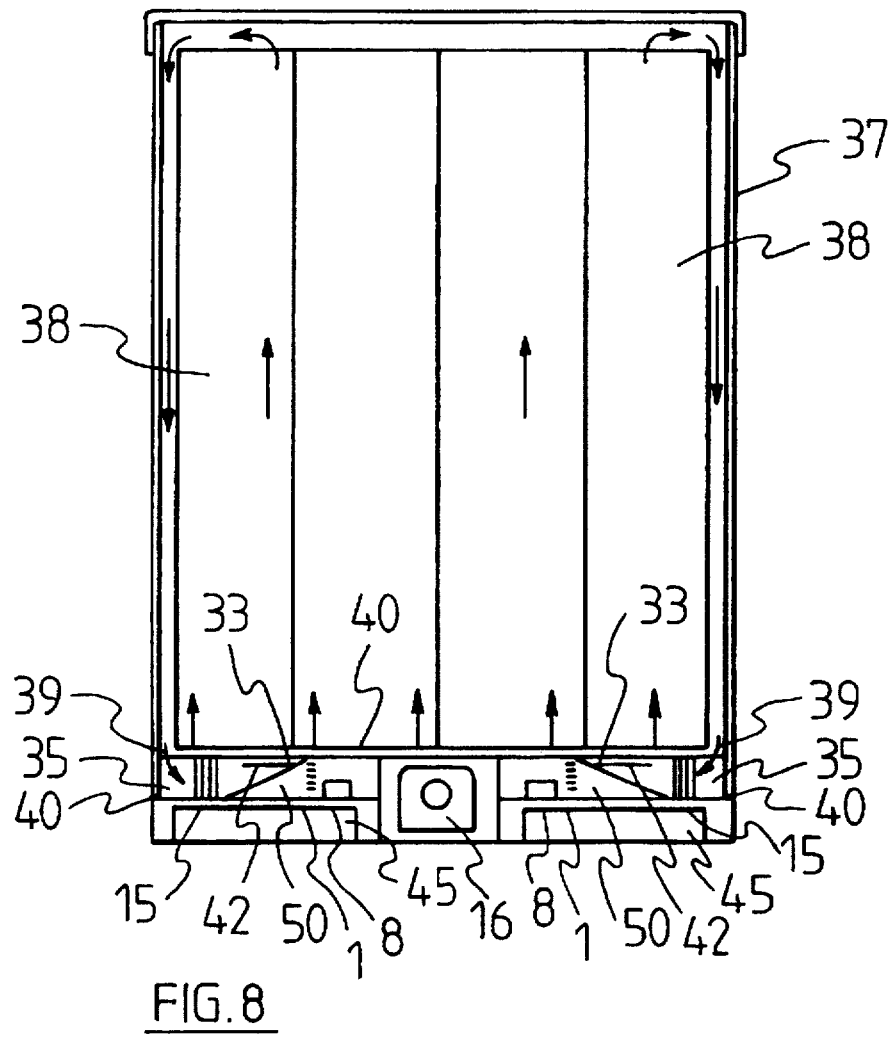
FIG. 8 shows a side view an alternative packed form of the invention with the refrigeration unit combined with the pallet, having a cardboard surround of packaged or loose produce (preferably meat) which is stacked on the unit and pallet.
Figure 15:
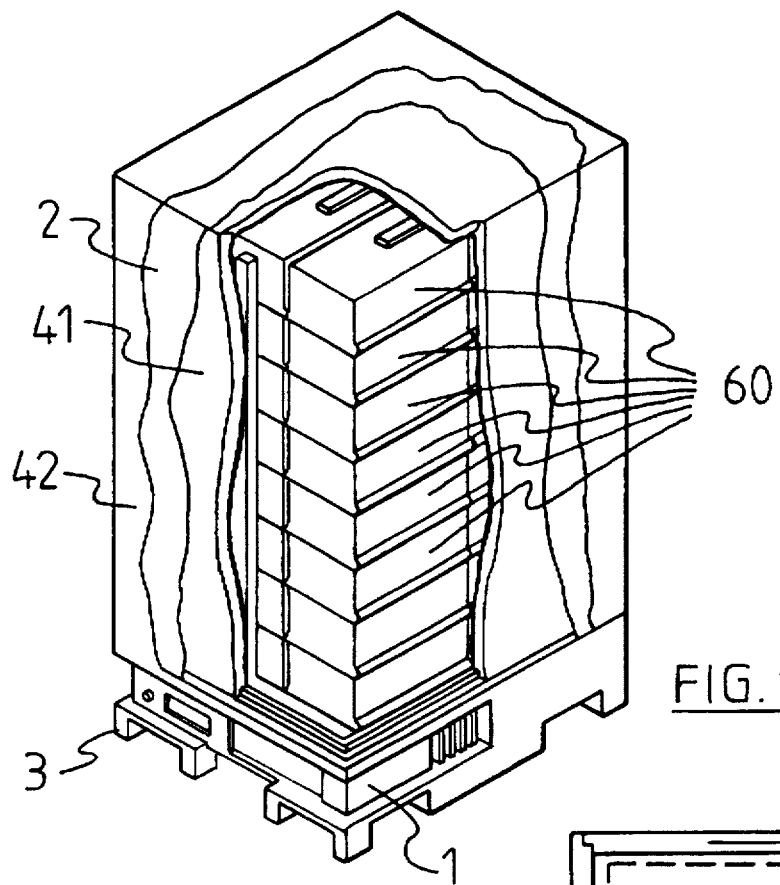
Figure 16:
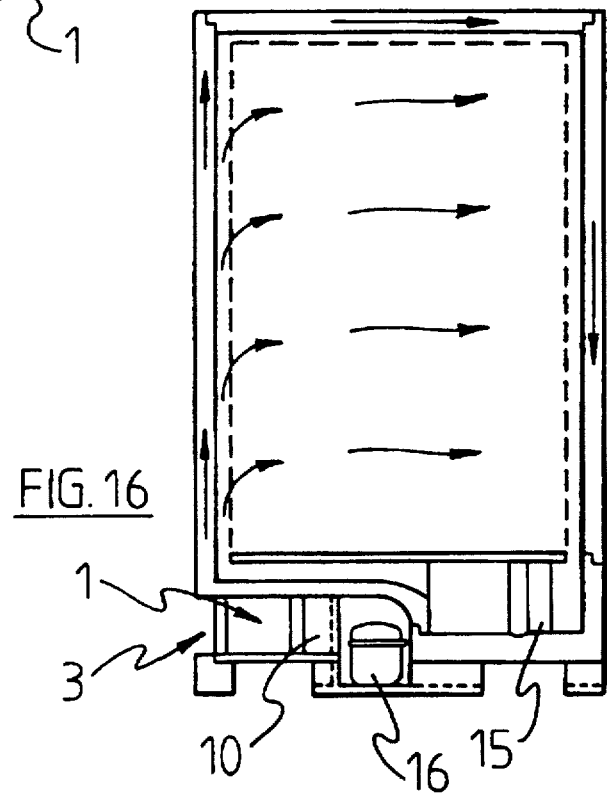
Figure 17:
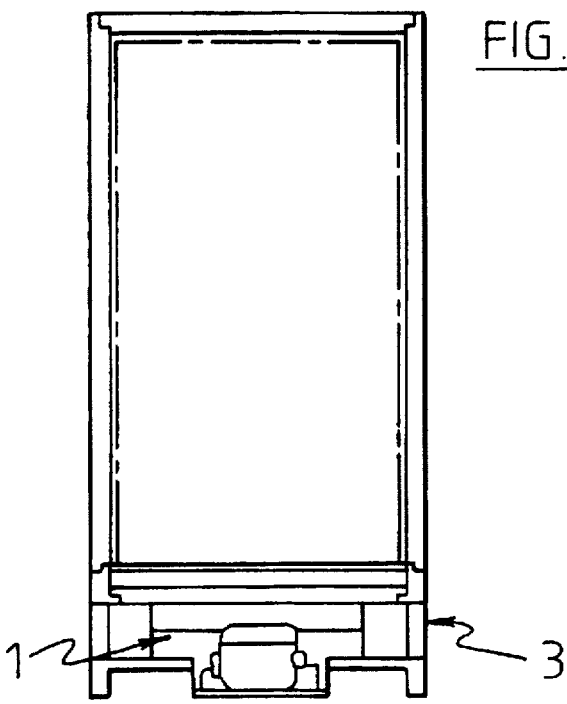
Figure 18:
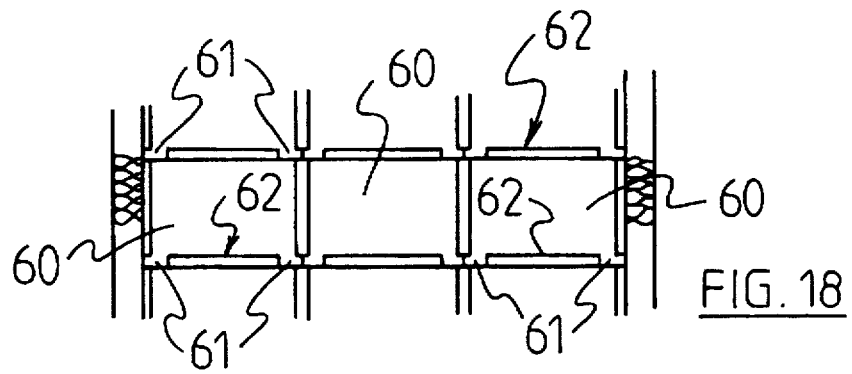
Figure 19:
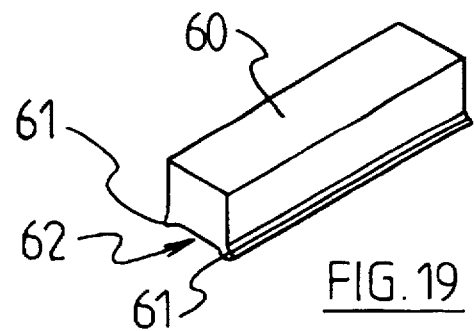
Figure 20:
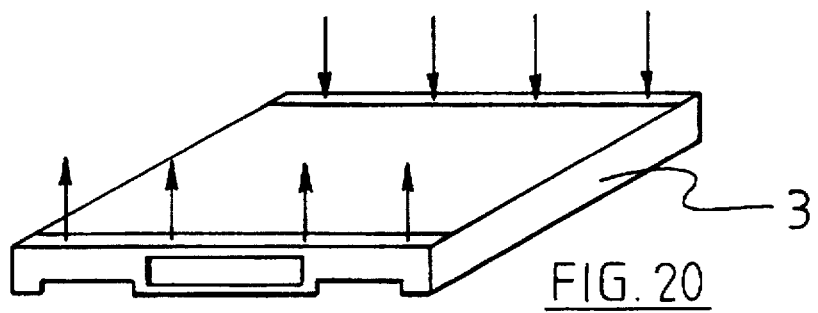
Figure 21:
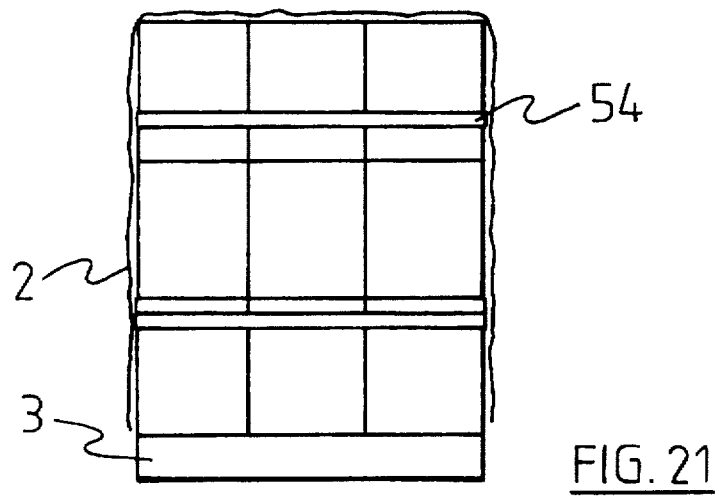
Figure 22:
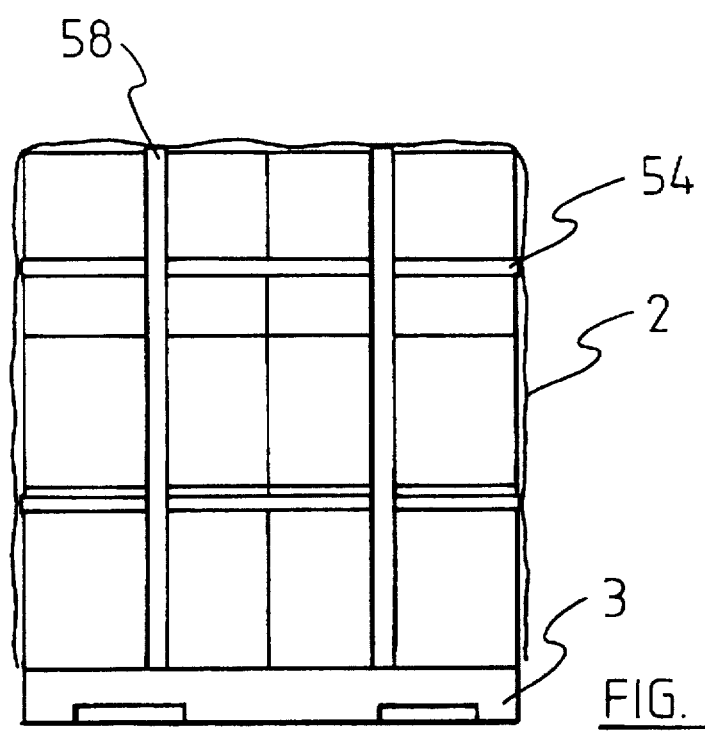
Figure 23:
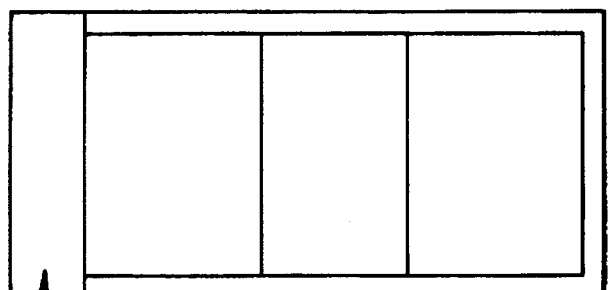
Figure 24:
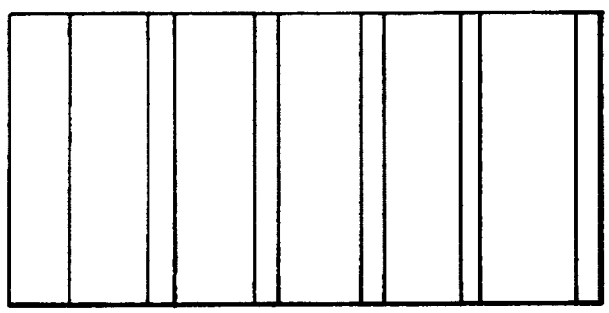
Figure 25:
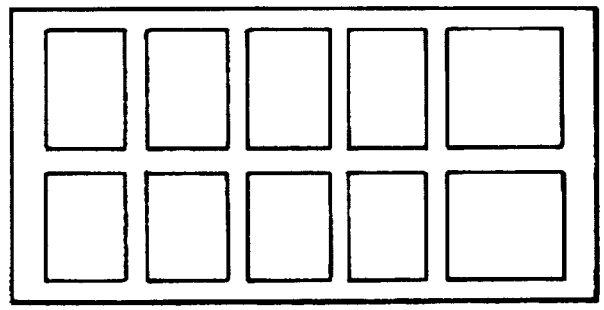

FIG. 15 is a perspective view of an alternative form of the invention in which a refrigeration unit is provided within a pallet, produce being placed onto said pallet, said produce then being substantially enclosed in a plastics bag and optionally insulation panels and outer cardboard casings, the covering of the produce is preferably held in place with plastic securing strips and means are provided to seal the plastics bag to the pallet;

FIG. 16 is a sectional side elevation of the invention as shown in FIG. 8;

FIG. 17 is a sectional end elevation of the invention as shown in FIG. 8;

FIG. 18 is a partial sectional end elevation of the form of the invention as shown in FIG. 15 showing the backing of boxes of produce, said boxes having air ducts provided there through;

FIG. 19 is a perspective view of an individual produce box as shown stacked in FIG. 11;

FIG. 20 is a perspective view of an alternative form of the pallet refrigeration unit;

FIG. 21 is a end elevation showing a pallet of the form illustrated in FIG. 13 showing produce loaded thereon and strapped so as to be held in place;

FIG. 22 shows a side elevation of the loaded pallet as shown in FIG. 14;

FIG. 23 is a plan view of a see container containing there within a number of units according to the present invention, in this form of the invention a master slave type relationship may exist between a refrigeration unit and a variety of slave produce containing units;

FIG. 24 shows a sectional plan view showing the arrangement of various units according to the present invention said arrangement involving the provision of air gaps or ducts between the individual units whereas the units themselves abut against the interior walls of the see container;

FIG. 25 is a sectional plan view showing another arrangement of the units according to the present invention whereby air gaps or ducts are provided between the individual units and between the interior wall of the sea container; and FIG. 26 is a side cross sectional view of the most preferred form of the present invention, this form of the present invention uses internal (with respect to said plastics material) insulation panels 200. These panels are self supporting and are sized in a range so as to provide an air duct around the stacked produce or cargo to a 1 contained therewithin, the outer surface of the insulating panels is covered and sealed with a barrier material 2, for example, a plastics bag, the barrier material is sealed against the pallet base 3. Also shown is the gas barrier 33 between the hot and cold sides of the refrigeration system.

DETAILED DESCRIPTION OF THE INVENTION

In preferred forms of the present invention as described the unit is operated in a number of different ways but each has the use of a refrigeration unit 1 and a plastics bag or other sealing barrier or means 2 positioned directly or indirectly on a pallet 3. By "plastics" is included for example foils, plastics, paper and other material including combinations thereof eg metallized plastics film. Preferably the plastics bag is a PVC air impermeable film.

In other forms of the invention the plastics bag is constructed from barrier film. In yet other forms the film is of the type which absorbs, at least in part gases for example carbon dioxide, methane or ethylene.

Figure 1:
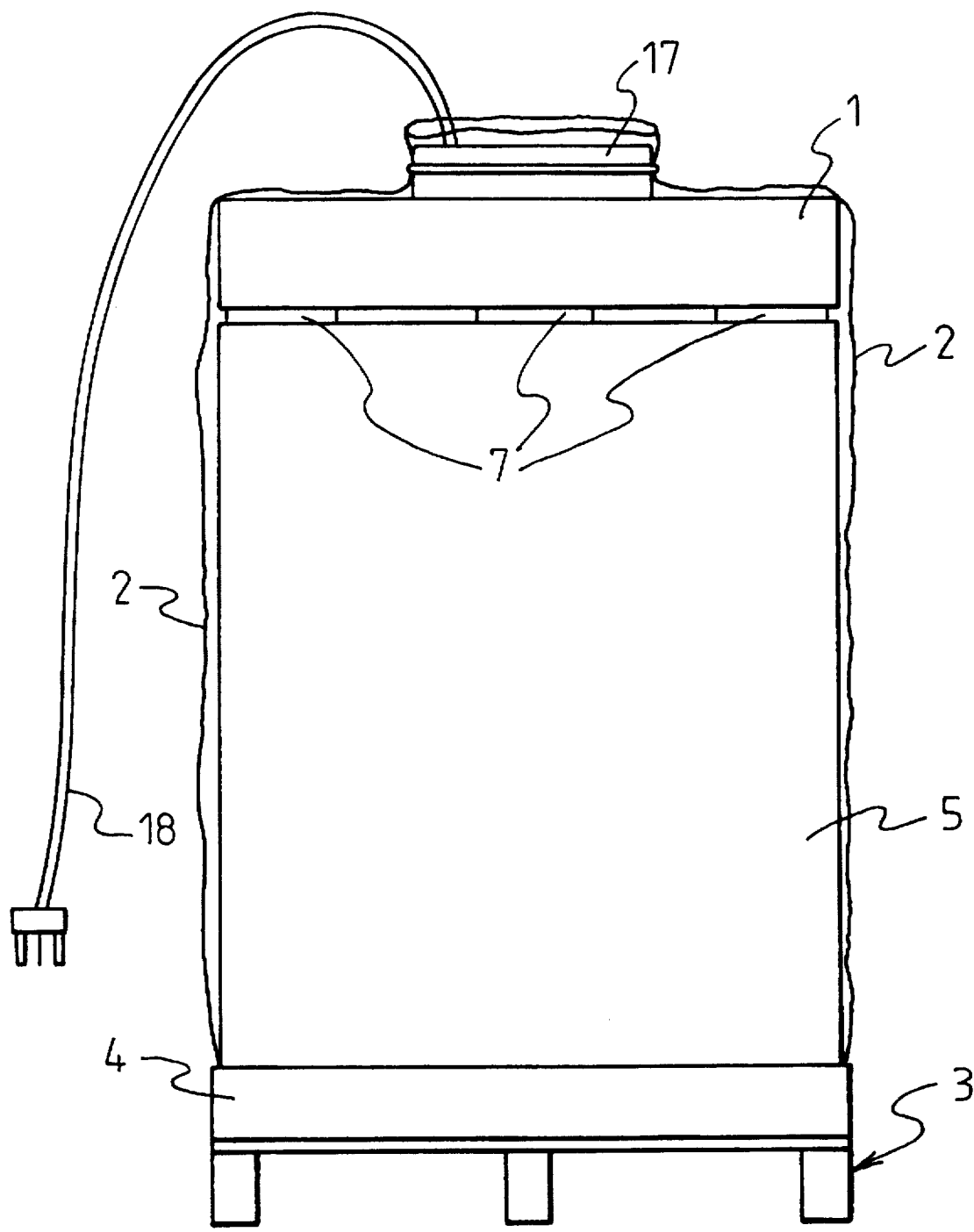
Figure 1A:
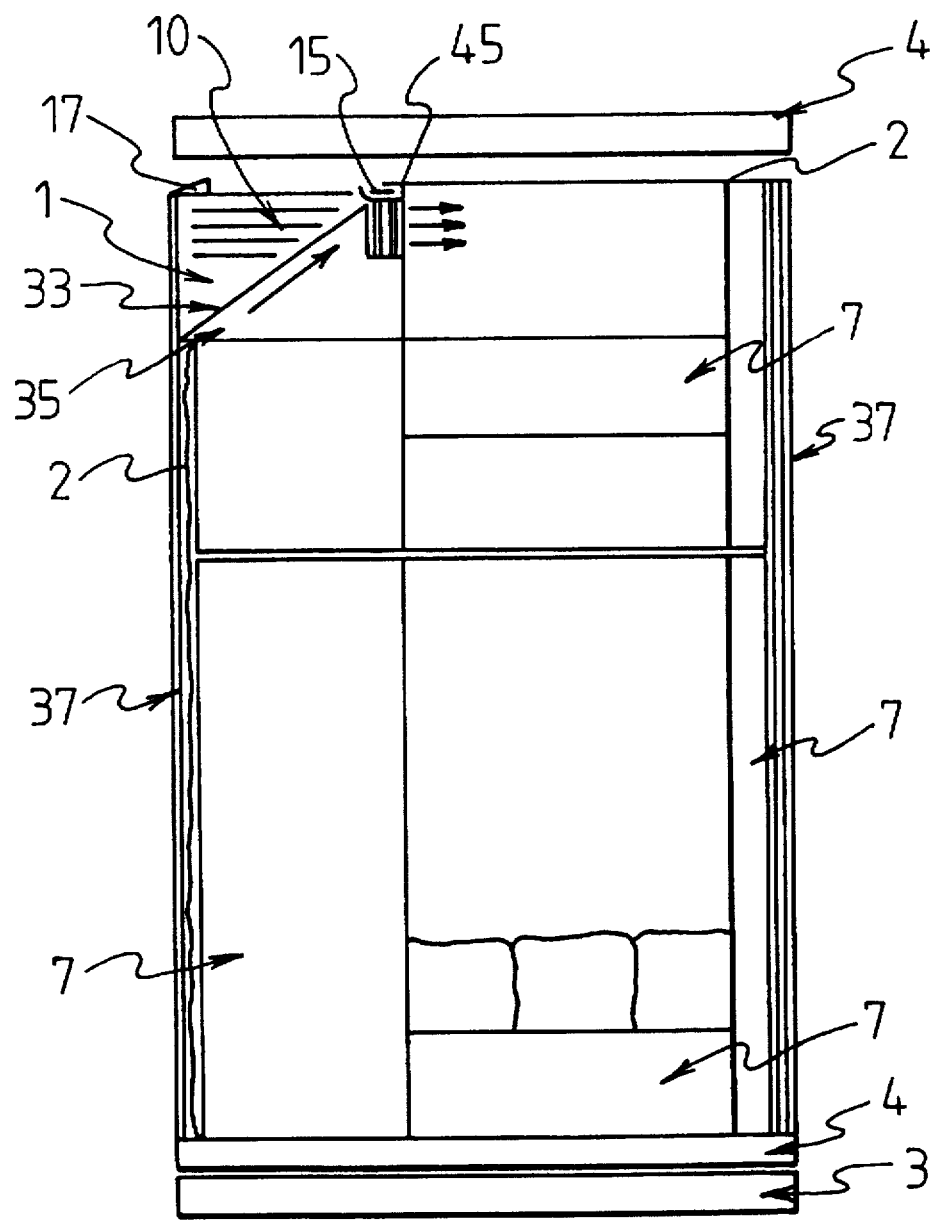
Figure 2:
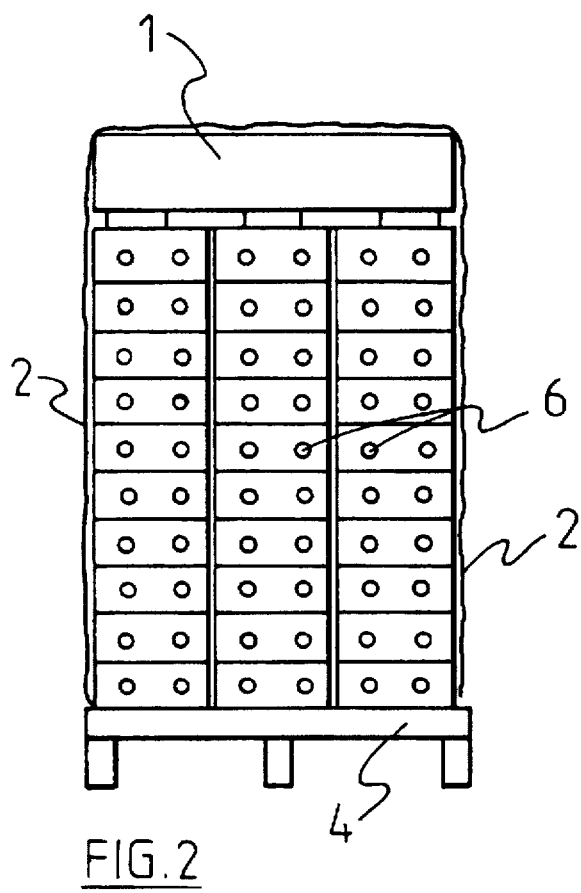
Figure 3:
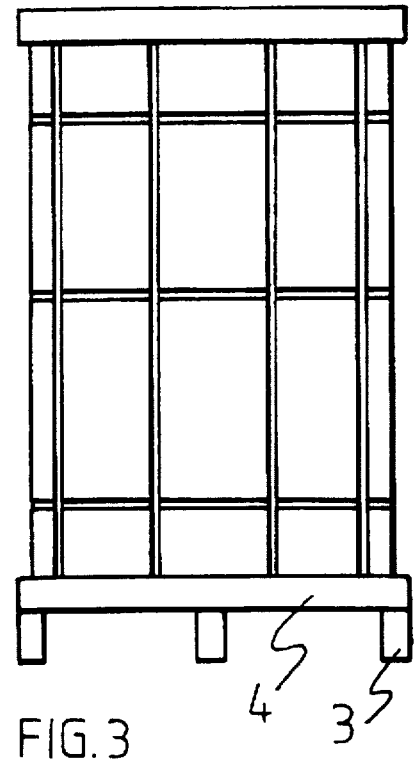
FIG. 3 shows the assembled arrangement of FIG. 2 preferably also with a top cap which is the same as the base tray placed on top of the pallet.
Figure 4:
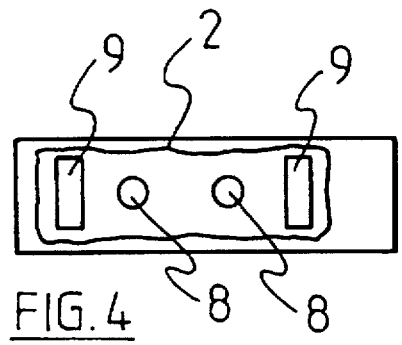
FIG. 4 shows an arrangement from above whereby a bag can be sealed about the inlet/outlet openings to the condenser i.e. to and from the condenser fans.
Figure 5:
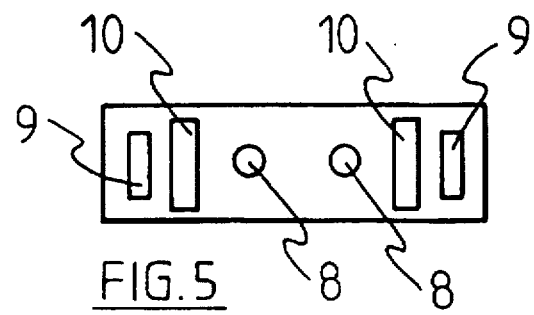
FIG. 5 is the top view of a preferred refrigeration unit in accordance with the present invention.

As shown in FIGS. 1, 2 and 3 the pallet 3 has a cardboard and preferably plastics lined tray 4 placed thereon within which the base of the plastics bag 2 is located so that loose produce within either a cardboard or other liner 5 within the plastics bag 2 or discreet cartons 6 within the bag 2 can be positioned.

In other forms of the invention the tray or plate is of high thermal conductivity, eg; metal. This lessens the likelihood of "hot" or "cold" spots building up.

The stack of cartons 6 either directly or via an appropriate spacer (preferably via a spacer) supports the refrigeration unit I. In the form as shown in FIG. 1 the supporting cardboard or the like members (skeletal or otherwise, particularly if of a wood) locate members that are placed across the top thereof, these members 7 in the preferred case of the arrangement of FIG. 1 then supporting the refrigeration unit.

In another form of the invention shown in FIGS. 8-14 the stack of cartons 6 is supported either directly or via a ribbed or raised floor by the refrigeration unit and pallet.

Figure 6:
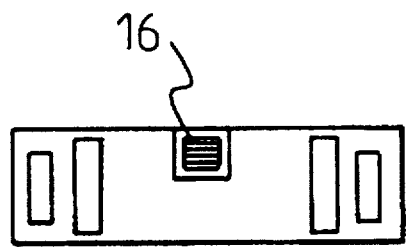
FIG. 6 is the same view of FIG. 5 but without the top lid thereof.
Figure 7:
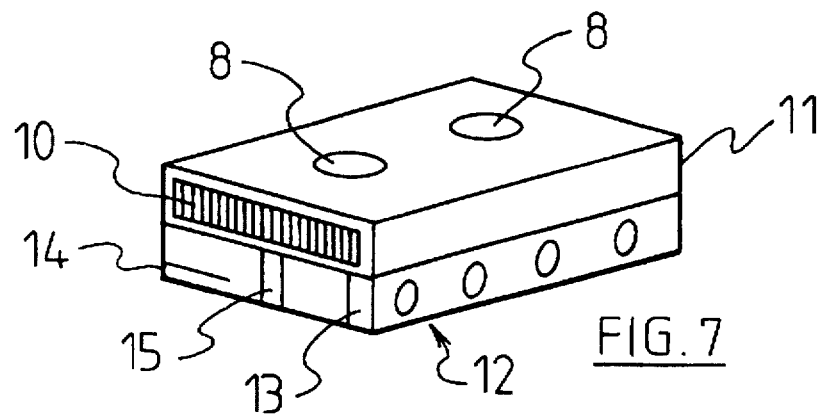
FIG. 7 is a perspective view of the refrigeration unit.

The refrigeration unit 1 as shown in FIGS. 4 through 7 and 8, 10, 11, 12 includes exhaust fans 8 condenser intakes 9 and condensers 10. The compressor 16 is shown in FIG. 6.

Disposed on the other side of the unit within the housing 11 is the evaporator region (the evaporator is indicated by reference 15) of the refrigeration system with its own circulating fans 13 and air intake 14.

Persons skilled in the art will appreciate how a variety of different means can be provided about the inlet/outlet to the condenser side of the refrigeration unit allowing the sealing thereof thereto either within a channel or about a flange as, for example shown, in FIG. 1 where an "O" ring 17 is shown.

Not shown in FIGS. 4 through 7 but shown in FIG. 1 is the provision of an electrical lead 18 into the refrigeration unit at a region thereof not requiring sealing to the plastics bag.

As shown in FIGS. 18 and 19 in forms of the invention a produce container is provided 60 said produce container having projections or extensions 61 on surfaces thereon for example as illustrated on the bottom surface thereof these extensions or projections provide a duct or air gap 62 so as to facilitate the flow of air over the produce. As shown in FIGS. 15 and 16 in a preferred form of the invention at least when meat is being transported the flow of air is substantially upwards along an interior wall of the container across through and therefore over the produce and then down the opposing interior wall.

As illustrated in FIGS. 15, 16 and 17 in forms of the invention in addition to the plastics bag 2 there is provided additional layers or sheets of insulating material 41 for example polystyrene foam. In other forms of the invention an additional protective layer 42 for example cardboard is provided over the plastics sheet. In forms of the invention straps 53 and 54 may be provided so as to hold the produce in place while being stored or transported. In other forms of the invention these straps may stand proud of the boxes of produce thereby creating air ducts or gaps thereover. In other forms of the invention the air gaps may be provided by the stacking proximity of other similar produce carrying units or the interior walls of a sea container. In other forms of the invention various packing or projections may be provided on the produce, containers or the interior of the pallet based pack so as to provide for air ducts or gaps.

As shown in FIG. 8 an alternative form of the invention has a stack of cartons 6 either directly or indirectly via ribbing or an appropriate facer placed on the pallet and refrigeration unit or combined refrigeration pallet unit. In the form shown in FIG. 8 the stack of cartons is surrounded by a layer of cardboard 37 which may be plastics lined. The use of the packaging guide 39 to line up the stack of cartons in a position and the use of the step for insulation 40 to correctly line up the produce encompassing insulation 37 produces a gap 38 between the said stack and said insulation which provides for the return flow of air. This return air duct and the ribbed floor 40, which creates an air gap underneath the stack, allows for the return flow of air through the evaporator to the evaporator fan 42.

FIG. 11 and 12 show the positioning of the return air inlet 35 relative to the evaporator 15 and cold air outlet and the evaporator fan 42. Air flows along the return air duct 38 into the return air inlet 35, the air is kept away from the condenser and other system components by the division wall 33 it then is cooled by passing over or through the evaporator 15, it is then accelerated out the cold air outlet by means of the evaporator fan 42. The cooled air is then able to flow through the gaps provided by the ribbed floor and through the gaps between the cartons thus refrigerating them or keeping them refrigerated.

Figure 10:
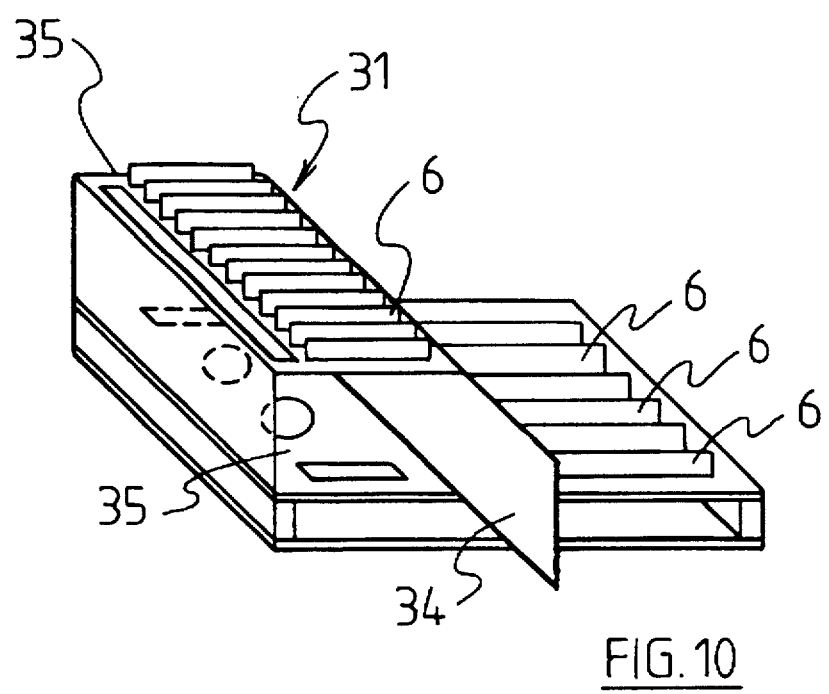
FIG. 10 is yet another embodiment where there is a rigid box on one side of a pallet that enables location/removal of refrigeration unit such as disclosed with reference to FIGS. 11 and 12.

As shown in FIG. 10 the refrigeration unit has a door 34 on one or more sides of said unit the door enabling the refrigeration unit to be serviced or settings to be changed. The figure also shows the pallet and refrigeration unit with a ribbed floor 6 and the return air opening on the top surface of the unit 35 with the cold air opening on the unit side 36. An alternative form of the invention is shown in FIGS. 8 and 14 where the refrigeration unit and pallet are combined into a slim line unit having a common, preferably ribbed, top surface the unit preferably has fork spaces 45 provided and air inlet, outlets on its top surface. This alternative form may include a plurality of condensers and evaporators to reduce overall height and has bottom air delivery and return air flow down two opposite sides of the pallet.

Figure 9:
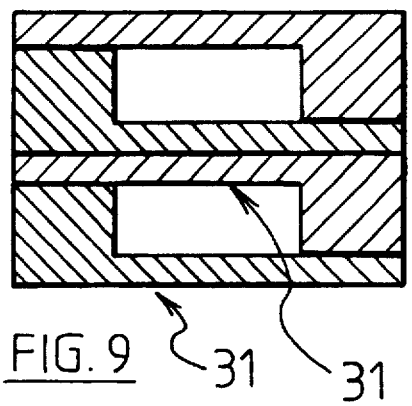
FIG. 9 shows units of FIG. 10 stacked on top of each other.

When not carrying produce the units occupy little space and FIG. 9 shows one embodiment of the invention stacked one on top of the other.

The movement of air from the evaporator area of the unit to the condenser area of the unit is restricted by the provision of a gas proof and preferably insulated barrier 33 which is shown in FIGS. 11 and 12.

The condenser is cooled by a separate flow of air which flows in through the condenser cooling air inlet 9 is accelerated by the condenser fan 8 and heated by the condenser and passes outside via the condenser cooling fan outlet.

FIG. 13 shows a slightly different embodiment of the invention wherein the door for accessing the internal components is located in the long side of the refrigeration unit.

The division 33 thus keeps the flow of refrigerated air which is contained and cycled within the insulation layer 37 separate from the outside air which is used to cool the condenser.

Persons skilled in the art will appreciate how a variety of different means can be provided about the inlet/outlet to the condenser side of the refrigeration unit allowing the sealing thereof thereto either within a channel or about a flange as, for example shown, in FIG. 1 where an "O" ring 17 is shown.

Not shown in FIGS. 4 through 7 but shown in FIG. 1 is the provision of an electrical lead 18 into the refrigeration unit at a region thereof not requiring sealing to the plastics bag.

The preferred form of the invention has a division labelled 33 which restricts the movement of air from the evaporator to the condenser.

Persons skilled in the art will appreciate the departure that the present invention offers from existing refrigerating transport systems. Persons will also see how the present system could with little adjustment allow gas flushing, or, even using a modification to the refrigeration unit, a measure of air evacuation from within the bag 2.

Another variation is the inclusion of heating elements to either double as defrost elements in the evaporator or as heating for base of pallet. This enables the pallet to transport produce which is required to travel at a warm ambient temperature but be stored in a hold with frozen produce.

Yet another variation is the inclusion of heating elements and a means for increasing the $CO_2$ gas content of the air circulating through the produce. This enables fumigation process to be undertaken, ie. increase temperature to approximately 40° C. and increase $CO_2$ content for half an hour.

The invention may broadly be said to consist of a refrigeration unit associated either directly or indirectly with a pallet. The refrigeration unit is provided with either an external energization source, which may consist of electrical energy provided by means of a power cable or otherwise, or an internal energization source which may consist of a battery, power cell or alternatives. The invention provides a means of separating evaporation cooled air from the condenser warmed air.

Preferably the evaporator cooled air is cycled over or through a stack of produce which is either directly or indirectly supported by the pallet. Preferably the means for separating and recycling the cooled air flow is insulated.

At least the preferred form of the present invention provides a system or apparatus whereby produce can be sealed within a controlled temperature and preferably atmosphere environment. The sealing barrier or means is preferably of a type to enable it to be unsealed to allow access to the cargo, for example, for customs inspections or unloading of part or all of the produce contained therein.

An advantage of the present invention is that several pallets can fit into a transportation vehicle or storage area which is often capable of controlling only one temperature. The major application of the invention is to use different palletised loads or containers, each containing the different type of cargo in the same transport vehicle or storage area with each palletised load or container being held at its optimum keeping temperature.

The refrigeration system or plant can either be built into the pallet base or located on top of the palletised stack. Obviously the system can be sized to fit any pallet sized dimensions, for example, iso. Euro pallet.

The cold side of the refrigeration system is separated from the hot side of the refrigeration system by means of a gas barrier.

The present invention uses a gas type barrier to seal and separate the refrigerated are a from the hot air generated by the condenser. Thus the evaporator cold side of the refrigeration system is separated from the condenser hot side. It is possible to seal the barrier around the condenser. This is a lesser preferred technique owing to difficulties with resealing after opening.

The gas barrier also provides a possibility of flushing or vacuuming out the gas atmosphere contained within a container or palletised load and injecting a suitable atmosphere or mix of gases, for example, 99% $CO_2$. In various non-respiring items of produce such as fish this enables the shelf life of the produce to be increased. In forms of the invention it is not thought necessary to constantly monitor and control the atmosphere, the mix of gases simply injected and the container or load resealed In other forms of the invention the bag material or gas barrier may consists of semi permeable material to allow for the exit or entrance of selected gases, for example, ethylene. In other applications the barrier material could be entirely non permeable.

Several methods exist to seal the bag for example, the side of the bag can be located into a preferably moulded metal cavity which is affixed around the pallet base. A nylon strap could firmly lock the plastic bag into the cavity to provide a gas tight seal. The bag or barrier material could also be sealed by a water trap device which is permanently fitted into the pallet base.

Various applications may require the addition of insulating material. The thickness of the insulation can be varied depending on the application. The type of insulation material can also be varied according to the application.

It is believed insulation may be designed to enable containers or palletised loads according to forms of the present invention to control its cargo or produce temperature while operating in an external environment range of −18° C. to +20° C. Should the invention be operated outside these temperature ranges additional insulation may be required. This may be added in the form of a flexible cover or another insulation wrap. Alternatively thicker panels or containers can be used. Obviously less insulation is used when required.

Any insulation is designed to allow easy assembly and disassembly to enable the load to be inspected, for example, at Inter State and country boarders. This also enables the produce to be partially or fully unloaded at its destination.

The insulation panels themselves may include spacer elements which when butted against the sides of the cargo or produce form air plenums. The said spacer elements may be designed in a pattern to obtain the maximum aerodynamic advantage so that the air flow is sufficiently spread over the sides of the palletised cargo to allow for optimum temperature control.

Under normal handling there is likely to be load movement as well as deformation and possible damage of the outer casing. These occurrences could result in a fully or partially locked air flow pathway which could result in warming of some parts of the cargo or produce. In order to overcome this some components of a packing system, for example, with spacer elements may be made from a strong material such as moulded plastic or foam plastic insulation.

In other forms of the invention built into the pallet base or other refrigeration unit may be extendable or telescopic spacer elements which are designed to cover the length of one or more sides of the palletised cargo either before or after affixing the plastic bag or barrier material and/or insulation container to the cargo or produce. When installed or constructed the spacer elements form plenums which allow the air to circulate in a manner which provides the desired spread of air around the cargo.

Alternatively the spacer elements may consist of some form of moulded plastic pattern which covers four sides on top of the palletised cargo. The plastic patterns could be made from flexible and non-flexible materials and may fit over the cargo like a net and be shaped in the form of a bag.

Obviously polypropylene insulation may be used instead of cardboard.

The refrigeration system will now be described. The cold side of the refrigeration system deals with air onto the refrigeration (evaporator) coil air off the refrigeration (evaporator) coil. The system circulates air either around and/or through the produce. Air is moved by fans or convection means. The air pattern is determined by air plenums and ducts which may be incorporated into the refrigeration plant. Further ducts and plenums are provided by the configuration of the packaging system and/or built into the cargoes packaging. The fan may be variable speed to allow for optimum cooling.

The hot side of the refrigeration system deals with air onto the condenser 10 and air off the condenser. Ambient or cool air to the condenser is sucked (by mechanical means) through air ducts including those provided by forklift access channels in the purpose built pallet bases. Hot air off the condenser 10 is vented so that it does not directly recycle back to the condenser 10.

When several palletised loads or containers according to forms of the present invention are stacked together in an unventilated or refrigerated space there may be no means for the hot air generated by the condenser to escape to the atmosphere. In a possible worse case hot air builds up with the space to a level where it is not possible for the units to continue to refrigerate their cargo.

Another potential problem exists when the palletised cargo or containers are butted up against each other and/or walls, for example, that of a truck and other cargo in a manner that restricts or blocks hot air coming off the condenser 10. This may have the effect of forcing the hot air to recycle directly onto the condenser 10 again or part of the hot air may recycle and another part rises communicating directly with the outer sides of other palletised cargoes according to a form of the present invention. This may have the effect of warming the sides of said palletised cargo and making it difficult or impossible for the system to refrigerate its cargo.

There are various ways of solving this problem.

The preferred option is to incorporate air channels or ducts into the pallet base for the purpose of carrying the hot air to a point where it is able to be vented without being directly recycled and re-used by the refrigeration system. These air channels could be configured into a pattern. The pattern in each pallet base could be the same so that the channels of adjacent units interconnect when they are butted together. The channels could carry hot air from the pallet bases to an outside position when it could then be vented.

An other means to overcome this problem is to provide spacer elements around one or more sides of each unit or palletised cargo so that when sides abut against each other there is a space provided which allows hot air from the condenser of each pallet unit to be vented up one or more sides of the container. This is a less attractive option as it does not maximise the cargo to transport or storage base ratio. Also hot air which does not intermix with sufficient ambient here will lead to warming of the sides of the container and may have an adverse effect on the cargo therewithin.

Another means is to incorporate into the pallet base two forklift channels. One forklift channel becomes the duct to supply air onto the condenser whereas the other is used to vent hot air off the condenser. This technique would require adjacent palletised loads or containers to be abutted so that the correct forklift channel communicated with each other. The supply air would enter from the last palletised load in a row connected to the air channel, possibly facing a wall. The hot air would vent from the last palletised load in a row connected to the vent at the opposite end to which the supply air enters.

Another method is to provide some form of air duct to channel the hot air from the condenser 10 to a position above the top of the palletised load or container.

Yet another method to overcome this problem is to physically separate the hot and cold side of the refrigeration system by locating the cold side at the base of the palletised load or container and the hot side at the top. In between could run the necessary cables and pipes.

In the situation where the transport vehicle or storage house is well ventilated sufficient cool air may flow under or through the pallet base so that hot air from the condenser dissipates quickly. Such a situation would enable the palletised loads to be butted up against each other on one or four sides and the hot condenser air to be directed into the ventilated ambient or cooled air flow running through or under the pallet base.

For example, in curtain-sided trucks the bottom edge of the curtain could be raised in order to provide sufficient ventilation to the units palletised load or container.

A defrost element is used to provide heating to the refrigeration system. The heating system is used when the unit is located on an external temperature below its required control temperature. For example, the palletised load or container could be set to hold fresh meat at a temperature −1° C., be located in environment of −18° C. instead of providing refrigeration the unit will need to provide heating for example, by using a resistance heater in order to maintain the correct temperature.

The system may consist of periodic heating or consistent warning. The air speed may of course and is preferably controlled by variable speed fan.

The refrigeration unit may be designed in a modular form so it can be easily removed from the pallet base for repair or maintenance.

As mentioned earlier the fan is preferably one of variable speeds, humidity is a factor, the temperature difference of the air coming into and off the refrigeration coil. This is effected by the speed of the fan, ie. high speed fan equals less temperature differential than is required for a low speed fan. Managing the temperature differential using the fan speed can therefore raise or lower humidity levels.

Obviously electronic components within the refrigeration unit need to be protected from water and dust.

Various forms of power supply are envisaged, for example, mains power supply, a portable generator, battery power, solar power or any combination thereof.. Although the refrigeration system described as being primarily electrical it could possibly be powered by any mechanical means, ie. hydraulic.

There is an advantage in incorporating rechargeable batteries within the unit as this enables short haul or storage periods of say one to five days during which the unit need not be connected to electric power. This also enables the units or palletised loads or containers to be transported on vehicles or stored in areas not equipped with electric power.

The refrigeration system is preferably monitored and alarmed for over temperature conditions.

A time delay switch could be fitted to the fan should the refrigeration system fail. Such failure could result in the loss of produce due to an over temperature condition.

In preferred forms of the invention a backup appropriate temperature sensor is linked to a isolation switch which automatically shuts down the system. It is also possible to include an audible or other alarm which may, for example, be connected to a remote sensing system.

If the external environment of the palletised load or containers holds frozen products power to the refrigeration unit may be cut off to allow the chilled cargo or produce, ie. meat to slowly freeze.

There are a variety of options for different air flow patterns, for example

1. Circulating air around all four sides and the top of the palletised load or container by means of plenums.
2. Circulating air horizontally through the cargo/cargo packaging by means of at least two air plenums located on opposite sides to each other and air ducts built into the cargo packaging inbetween the plenums. One plenum being slightly pressurised.
3. Circulating air vertically through the cargo/cargo packaging by means of at least two air plenums (one located at the top of the pallet stack the other located at the bottom of the pallet stack) and through air ducts created by the cargo packaging inbetween said air plenums. At the bottom the air returns up the outer sides of the palletised stack of cargo in a air space between the cargo and the pallet container.
4. Circulating air vertically through at least one air plenum located towards the centre of the palletised cargo, forcing the air more or less horizontally through the air ducts in the cargo packaging running at 90 degrees to the vertical air plenum, flowing outwardly to the sides of the pallet stack and into an air plenum inbetween the outsider sides of the palletised cargo and insulation container, then returning into an air plenum at the top of the palletized stack and onto the refrigeration coil thus completing the cycle. If the unit is mounted at the base of the palletised cargo then this air flow pattern would be reversed. Utilising the chimney packaging concept developed in Australia.
5. Cycling air up one half of the palletised cargo and returning it down the other half of the palletised cargo. The two air streams separated by a gas barrier provide by the cargo packaging or affixed by plastic material or other means. And if so two fans one at the top and one at the bottom could be used to move the air.

Basic principle is that the air flow enters at least one duct between one edge of the palletised load carry plate ("plate") and side of base unit, onto the refrigeration coil positioned underneath the plate, off the refrigeration coil and is direct to at least another edge of plate, air flows between this side and the side of the base unit up into a plenum created by the configuration of the palletised load and packaging components. The air may circulate around the four sides and top of the palletised load returning the inlet entry duct to complete the cycle or may travel through the cargo to that point.

Either around/or through the cargo produce or cycles off the refrigeration coil, down through ducts created by the cargo packaging into an air plenum which directs air to the outer an side or sides of the base of the container, up said side or sides, into a top plenum, then enters through ducts communicating with the plenum and onto the refrigeration coil.

Various methods exist to load the produce or cargo onto the pallets or into the containers according to the present invention. One example is the use of an additional pallet which is first load, sealed if required and then lifted and transported onto the pallet accordingly to the present invention.

We claim:

1. A method of transporting or storing cargo comprising the steps of:

providing a pallet member;

loading onto the pallet member the cargo to be carried;

at least partially encompassing the cargo with a barrier material;

providing within said pallet member a refrigeration system including an evaporator, a condenser, and a compressor; said refrigeration system having a gas inlet and a gas outlet to and from the evaporator region of the refrigerator system, and a gas intake and a gas outlet to and from the condenser region of the refrigeration system, and a gas barrier between the two intake/outlet systems to prevent the movement of gas from one to the other; and operating said refrigeration system carried by said pallet member to cool the cargo, said barrier material providing some measure of separation between the gas associated with the cargo being cooled by the evaporator of the refrigeration system and the ambient gaseous environment being heated by the compressor of the refrigeration system.

2. The method of transporting or storing cargo as recited in claim 1, wherein said barrier material is of at least one of corrugated cardboard and plastics film.

3. A method of transporting or storing cargo comprising the steps of:

providing a fork lift carryable pallet, said pallet having thereon or therein a refrigeration system including an evaporator, a condenser and a compressor; said refrigeration system having a gas intake and a gas outlet to and from the evaporator region of the refrigeration system, a gas intake and a gas outlet to and from the condenser region of the refrigeration system, and a gas barrier between the two intake/outlet systems to prevent the movement of the gas from one to the other;

loading on said pallet, the cargo to be carried;

encompassing the cargo with a barrier material; and operating the refrigeration system to cool at least one of said cargo and gas associated therewith, said barrier material producing some measure of separation between the gas associated with the cargo being cooled by the evaporator of the refrigeration system and the ambient gaseous environment being heated by the compressor of the refrigeration system.

4. A fork lift carryable pallet comprising:

a housing having therein a refrigeration system including an evaporator and a condenser;

a gas intake and a gas outlet to and from the evaporator region of the refrigeration system;

a gas intake and a gas outlet to and from the condenser region of the refrigeration system; and a gas barrier between the two intake/outlet systems to substantially prevent the movement of gas from one to the other.

5. The fork lift carryable pallet as recited in claim 4, wherein the gas intake/outlet to and from the evaporator region of the refrigeration system is along one side of the pallet, and the gas intake/outlet to and from the condenser region of the refrigeration system is along a substantially opposite side.

6. The fork lift carryable pallet as recited in claim 4, wherein the fork lift carryable pallet has at least two channels, and the gas intake/outlet to and from the evaporator region is through or along one of the channels, and the gas intake/outlet to and from the condenser region is through or along the other of said channels.

7. A transportable unit comprising:

a fork lift carryable pallet as recited in claim 4;

cargo loaded directly onto said fork lift carryable pallet; and a barrier material enclosing said cargo and providing at least some measure of separation between the gas associated with the cargo being cooled by the evaporator of the refrigeration system and the ambient gaseous environment being heated by the compressor of the refrigeration system.

8. A refrigeration unit for association with a pallet based pack, the unit comprising:

a housing having therein an electrically operated refrigeration system including an evaporator and a condenser;

a gas intake and a gas outlet to and from the evaporator region of the refrigeration system;

a gas intake and a gas outlet to and from the condenser region of the refrigeration system;

a gas barrier between the two intake/outlet systems to prevent the movement of gas from one to the other;

means for sealing the mouth of a bag made of one of plastics, paper and foil to the housing about one of the gas inlet/outlet to the condenser region; and means for externally or internally energizing the refrigeration system.

9. The refrigeration unit as recited in claim 8, wherein the gas intake/outlet to the evaporator region is within a flanged region of the housing about which the mouth of the bag can be held by securing means.

10. The refrigeration unit as recited in claim 8, wherein the housing includes an encircling channel into which a region of the bag can be secured.

* * * * *